United States Patent [19]

Wilkinson

[11] 4,358,882
[45] Nov. 16, 1982

[54] MANUFACTURE AND INSPECTION OF AN ARTICLE

[75] Inventor: Bernard H. Wilkinson, Skipton, England

[73] Assignee: Rolls-Royce Limited, London, England

[21] Appl. No.: 150,671

[22] Filed: May 16, 1980

[30] Foreign Application Priority Data

Jun. 6, 1979 [GB] United Kingdom ............... 7919729

[51] Int. Cl.³ .................. B23P 15/02; B22D 2/00
[52] U.S. Cl. ................... 29/156.8 H; 29/25.35; 73/583; 73/618; 164/4.1; 249/175
[58] Field of Search .......... 29/156.8 H, 25.35; 73/583, 588, 618; 164/4.1, 132; 249/175

[56] References Cited

U.S. PATENT DOCUMENTS

| 2,378,237 | 6/1945  | Morris ............... 73/618 |
| 2,511,624 | 6/1950  | d'Halloy ............ 29/25.35 |
| 2,940,158 | 6/1960  | Mason ............... 29/25.35 |
| 2,972,805 | 2/1961  | Hignett et al. ...... 29/156.8 H |
| 2,983,988 | 5/1961  | Hansell ............. 29/25.35 |
| 3,056,938 | 10/1962 | Pappis et al. ....... 29/25.35 |
| 3,650,003 | 3/1972  | Toyoshima .......... 29/423 |
| 3,694,264 | 9/1972  | Weinland et al. .... 29/156.8 H |
| 3,820,208 | 6/1974  | Baldy ............... 29/25.35 |
| 3,845,808 | 11/1974 | Higginbotham et al. 164/136 |
| 3,850,717 | 11/1974 | Keur et al. ......... 29/25.35 |
| 4,285,235 | 8/1981  | Dugger .............. 73/618 |

Primary Examiner—Daniel C. Crane
Attorney, Agent, or Firm—Cushman, Darby & Cushman

[57] ABSTRACT

Some turbine blades are produced by casting, using the lost wax process. The blades may include cooling air passages and the wall thickness of these is tested ultrasonically i.e. by transmitting and receiving acoustic pulses from and to, a common transducer.

Lately the blades, having been cast, are directionally solidified. This process changes the grain structure such that during inspection, pulses received by the blade, have been dissipated. The invention provides ultrasonic testing ability by using a unidirectional pulse transmission system, resulting in pulses which, having passed outwards through the passage wall, still have sufficient energy to effect an indication of wall thickness.

4 Claims, 1 Drawing Figure

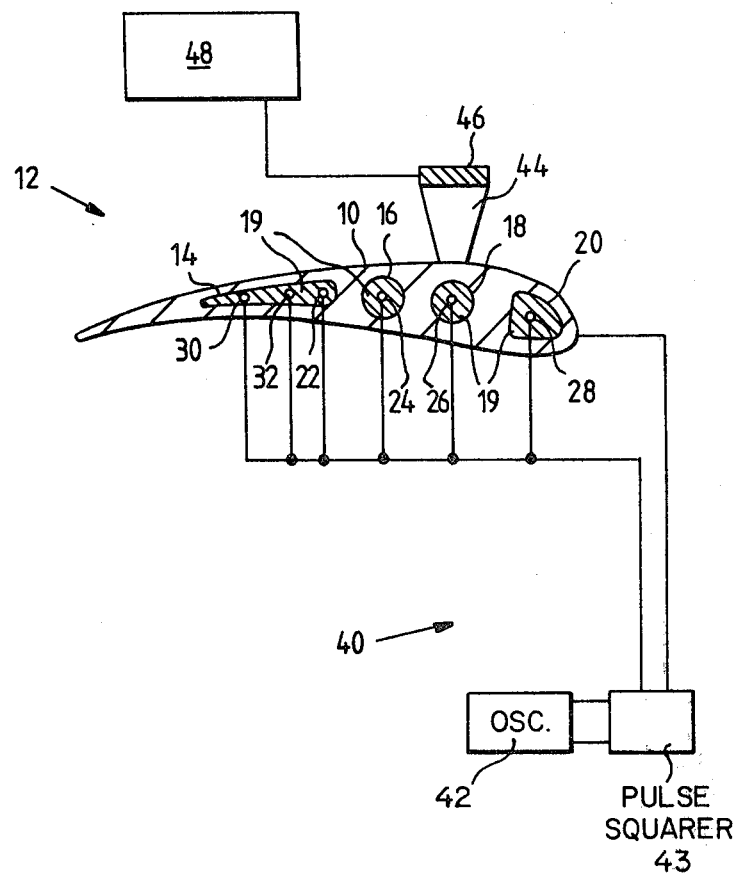

MANUFACTURE AND INSPECTION OF AN ARTICLE

This invention relates to the manufacture of an article which has passages formed therein and, the ultrasonic inspection of that article.

It is known to produce an article by the lost wax process, which articles includes passageways. The passageways are formed by first pre-forming a ceramic core to the desired shape of passageway, then locating the core as appropriate, in the wax pattern. After casting and solidifying of the article, the ceramic core is leached out, leaving the passageway clear.

It is also known to ultrasonically inspect an article made in the way described thereinbefore, in order to ascertain the wall thickness of each passageway. The method of testing consists of intermittently stressing a piezo electric crystal so as to generate acoustic pulses, and passing the pulses so formed, through a pulse carrying medium and into the article. The crystal is arranged so as to receive the rebounding pulses as well as transmit them and the wall thickness of the article is related to the time taken, for the crystal to both transmit and receive any given pulse.

Turbine blades which are used in jet propulsion engines, are produced by the lost wax process. However, the final stages of forming of the blades have now been modified i.e. the manner in which the cast blade is cooled, has changed. Instead of being retained wholly within a volume which falls from casting heat to room temperature, until cooled, the blade as it is cast is gradually withdrawn from the furnace in a direction longitudinally of itself into a much cooler atmosphere. It follows that during the process, one end of the blade will be solid and the other end liquid.

The process is called directional solidification and the end result is a blade, the grain structure of which lies parallel to the length of the blade. The ceramic core is then leached out and ultrasonic inspection attempted.

Whilst the directional solidification method provides tremendous advantages as regards producing a blade of greatly enhanced strength in given directions, its grain structure has defeated attempts to ultrasonically test the blade as hereinbefore described. It is therefore, an object of the present invention, to provide an improved method of manufacturing a passaged blade for a jet propulsion engine so as to enable some form of ultrasonic inspection of the passage wall thickness may be achieved.

It is a further object of the present invention, to provide an improved method of ultrasonically inspecting the thickness of a passage wall in an article containing said passage.

According to the present invention, there is provided a method of producing a passaged turbine blade, wherein the form and position of said passage is determined by pre-forming and pre-positioning a ceramic core in a pattern of the blade, which core is made from a leachable, ferroelectric ceramic, inserting an electrode in said core and, after forming said blade in a mould formed round said pattern, applying an electric stress to said core so as to give it piezo electric characteristics as defined herein, to enable ultrasonic inspection of the passage wall thickness, prior to leaching out the ceramic so as to clear the passage.

Preferably, the method includes the step of forming the blade by the lost wax process.

The method may include the step of directionally solidifying the formed blade.

According to a further aspect of the invention, there is provided a method of inspecting the wall thickness of a passage in a turbine blade including the steps of filling the passage with a ferroelectric ceramic, polarizing the ceramic as defined herein, connecting the ceramic into a pulsed electric circuit so as to obtain an acoustic pulse output from the ceramic, positioning a piezo electric transducer and pulse carrying medium so as to receive said acoustic pulses via the wall thickness of the passage and said medium and, on receipt of said acoustic pulses by said transducer, extracting therefrom electrical signals which correspond to said acoustic pulses and displaying them in a form indicative of the wall thickness of the passage.

The invention will now be described by way of example and with reference to the accompanying drawing:

In the drawing the aerofoil portion 10 of a turbine blade 12, is shown in cross-section.

Blade 12 is manufactured by the lost wax process which is well known, and by directional solidification, an example of which is disclosed in U.S. Pat. No. 3,845,808, issued Nov. 5, 1974, to Higginbotham et al. These processes therefore will not be described herein. Blade 12 has passages 14, 16, 18, 20 which extend throughout its length, so that in operation in a gas turbine engine (not shown) cooling air can be passed through the blade interior. However, as shown in the drawing each passage is filled with a ceramic material 19 which has been treated to give it piezo electric characteristics as defined later in this specification. The ceramic is first formed by moulding and baking, or by any other suitable means, into a shape corresponding to a respective passage and is then positioned in the wax pattern as appropriate. When metal is cast in a mould which is formed around the wax pattern, the ceramic preforms for the time being, become an integral part of the casting.

A respective electrode 22, 24, 26, 28 is inserted through the length of each ceramic preform prior to baking and protrudes from at least one of the preforms ends. The ceramic preform 19 filling passage 14, has two further electrodes 30, 32 embedded in it, because its chordal dimension is large relative to the remaining passages 16, 18 and 20 and therefore effectively forms a longer wall portion.

The ceramic used, must be a ceramic which deforms under electric stress i.e. an electrostrictive ceramic and, more specifically, a ferroelectric ceramic. An artefact produced from such a ceramic is made up of a series of elongate "domains" each containing a group of molecules and when no electric stress is applied, the domains lie at random angles relative to each other. When a voltage is put across the artefact the domains align their lengths with the field and the artefact expands. However, contrary to true piezo electric substances, such ceramics only expand, regardless of whether the voltage applied is positive or negative. It follows that, on applying an oscillating voltage to the ceramic, it would expand twice for each complete voltage oscillation and, in the context of the present invention, this is not acceptable. Therefore the ceramic 19 is permanently polarised whilst in blade 12, by heating the whole to above the Curie point of the ceramic and applying thereto 1000 volts per millimeter of thickness of the ceramic and maintaining it whilst the ceramic cools.

The end result of the treatment is that the ceramic stays polarised and if a small, oscillating voltage is applied, it will only make the "domains" of the ceramic move a small distance (measured in Angstroms) away from their polarised positions and back again in an expanding and contracting manner, depending on the direction of bias. The ceramic now acts in true piezo electric manner.

Blade 12 is then connected, via its electrodes 22 to 32, into an electric circuit 40 and a small, alternating voltage is applied via an oscillator 42, which may include a pulse squarer 43, to the ceramic cores 19 which expand once for each complete oscillation of the voltage.

The pulses are transformed into acoustic pulses and passed via a carrier medium which, in the present example is a perspex, (registered trademark) core 44 but which could be water, to a piezoelectric transducer 46. Transducer 46 reconverts the acoustic pulses to electric pulses and passes them to apparatus 48 for display in digital and/or analogous form in known manner.

The unidirectional application of the pulses, ensures that their energy is conserved to the extent of providing sufficiently strong signals from which indications of the wall thickness of the respective passages may be derived, despite the large, adversely orientated grain structure of the directionally solidified casting.

As stated hereinbefore, the present invention was derived, in order to overcome the difficulty experienced in ultrasonically inspecting the wall thickness of a turbine blade which has been produced by the combined techniques of the lost wax process and directional solidification. However, the invention is equally applicable to articles made by other processes, provided the ferroelectric ceramic can be tightly fitted within the article.

If the passage in the article is straight, or if it is any shape which lends itself to the insertion of the preformed ceramic core after manufacture of the article, the ceramic core may be polarised prior to fitting in the article.

I claim:

1. A method of producing a passaged turbine blade and inspecting it, comprising the steps of:
    forming a core of leachable ferro-electric ceramic material in the shape of a passage to be formed in the turbine blade;
    embedding an electrode in the leachable ferro-electric ceramic material;
    polarizing the leachable ferro-electric ceramic material;
    casting metal material to form the turbine blade around the core of leachable ferro-electric ceramic material;
    providing a pressure transducer for generating a transducer signal responsive to pressure applied thereto;
    bridging the blade and the transducer with a pressure transducing medium;
    applying an oscillating electrical potential across the core of ferro-electric ceramic material, causing it to alternately expand and contract, thereby transmitting pressure pulses through the blade passage wall and the medium to the transducer; and
    converting the transducer signal to a visual signal representing the blade passage wall thickness.

2. A method according to claim 1, wherein the step of polarizing the leachable ferro-electric ceramic material comprises the steps of:
    heating the leachable ferro-electric ceramic material to a temperature above its Curie point;
    applying an electrical potential of substantially 1000 volts across the leachable ferro-electric ceramic material; and
    maintaining the electrical potential while cooling the ferro-electric ceramic material to substantially room temperature, thereby polarizing it.

3. A method according to claim 1, wherein the step of casting comprises the steps of casting and directionally solidifying the metal of the turbine blade around the leachable ferro-electric ceramic material.

4. A method of measuring the thickness of a passage wall in a passaged metal turbine blade, comprising the steps of:
    forming a leachable, ferroelectric ceramic into a core of desired shape;
    casting a turbine blade around the core;
    embedding an electrode in the leachable ferroelectric ceramic material;
    heating the leachable ferroelectric ceramic material to a temperature above its curie point;
    applying an electrical potential of substantially 1,000 volts across the leachable, ferroelectric ceramic material;
    maintaining the electrical potential while cooling the ferroelectric ceramic material to substantially room temperature, thereby permanently polarizing it;
    providing a pressure transducer for generating a transducer signal responsive to pressure applied thereto;
    bridging the blade and the transducer with a pressure transmitting medium;
    applying an oscillating electrical potential across the ferroelectric ceramic material so as to cause it to alternately expand and contract and thereby transmit pressure pulses through the blade passage wall and the transmitting medium to the transducer; and
    converting the transducer signal to a visual signal representing the blade passage wall thickness.

* * * * *